United States Patent
Blume

(10) Patent No.: US 7,616,928 B2
(45) Date of Patent: Nov. 10, 2009

(54) METHOD OF IDENTIFYING A RADIO LINK

(75) Inventor: Oliver Blume, Stuttgart (DE)

(73) Assignee: Alcatel Lucent, Paris (FR)

( * ) Notice: Subject to any disclaimer, the term of this patent is extended or adjusted under 35 U.S.C. 154(b) by 567 days.

(21) Appl. No.: 11/486,281

(22) Filed: Jul. 14, 2006

(65) Prior Publication Data
US 2007/0026811 A1    Feb. 1, 2007

(30) Foreign Application Priority Data
Jul. 27, 2005    (EP) .................................. 05291618

(51) Int. Cl.
*H04B 17/00* (2006.01)
(52) U.S. Cl. ................................... 455/67.11
(58) Field of Classification Search ................. 455/436, 455/432.1, 435.1, 435.2, 435.3, 437, 439, 455/452.2, 67.11, 528, 522, 450, 445, 524, 455/509, 453, 442, 455; 370/310, 338, 235, 370/329, 335, 352, 328
See application file for complete search history.

(56) References Cited

U.S. PATENT DOCUMENTS

| 2005/0159166 A1 | 7/2005 | Jonsson et al. | |
| 2007/0026861 A1* | 2/2007 | Kuhn et al. | 455/436 |

FOREIGN PATENT DOCUMENTS

EP    1 418 782    5/2004

OTHER PUBLICATIONS

TKN: "Optimization of Handover Performance by Link Layer Triggers in IP-Based Networks." Aug. 2002.
3GPP: "3rd Generation Partnership Project." Release 6, 3GPP TS 25.413 V6.0., Dec. 2003.
3GPP: "3rd Generation Partnership Project; Technical Specification Group Services and System Aspects. (Release 6)." 3GPP TS 23. 107 v6.1.0, Mar. 2004.

* cited by examiner

*Primary Examiner*—Melody Mehrpour
(74) *Attorney, Agent, or Firm*—Fay Sharpe LLP

(57) ABSTRACT

The invention relates to a Method of identifying a radio link 1,1',1" of a terminal device 2 to a wireless communication system (3). The method comprises first step of determining values of parameters of $n \geq 2$ radio links, whereby the parameters of each radio link are suitable to quantify at least an aspect of the quality of service of this radio link, the parameters (QoS parameters) being generic QoS parameters usable by different radio network technologies. In a second step a value of a metric is calculated, for each radio link, with the associated determined QoS parameters, whereby the value of the metric defines the overall quality of service of the corresponding radio link. In a third step one of the $n \geq 2$ radio links (best radio link) is identified as being the radio link offering the best quality of service by comparing the $n \geq 2$ values of the metric calculated in the second step.

The method identifies a radio link which offers the best quality of service for a predetermined application in heterogeneous networks characterized by different radio access technologies.

14 Claims, 1 Drawing Sheet

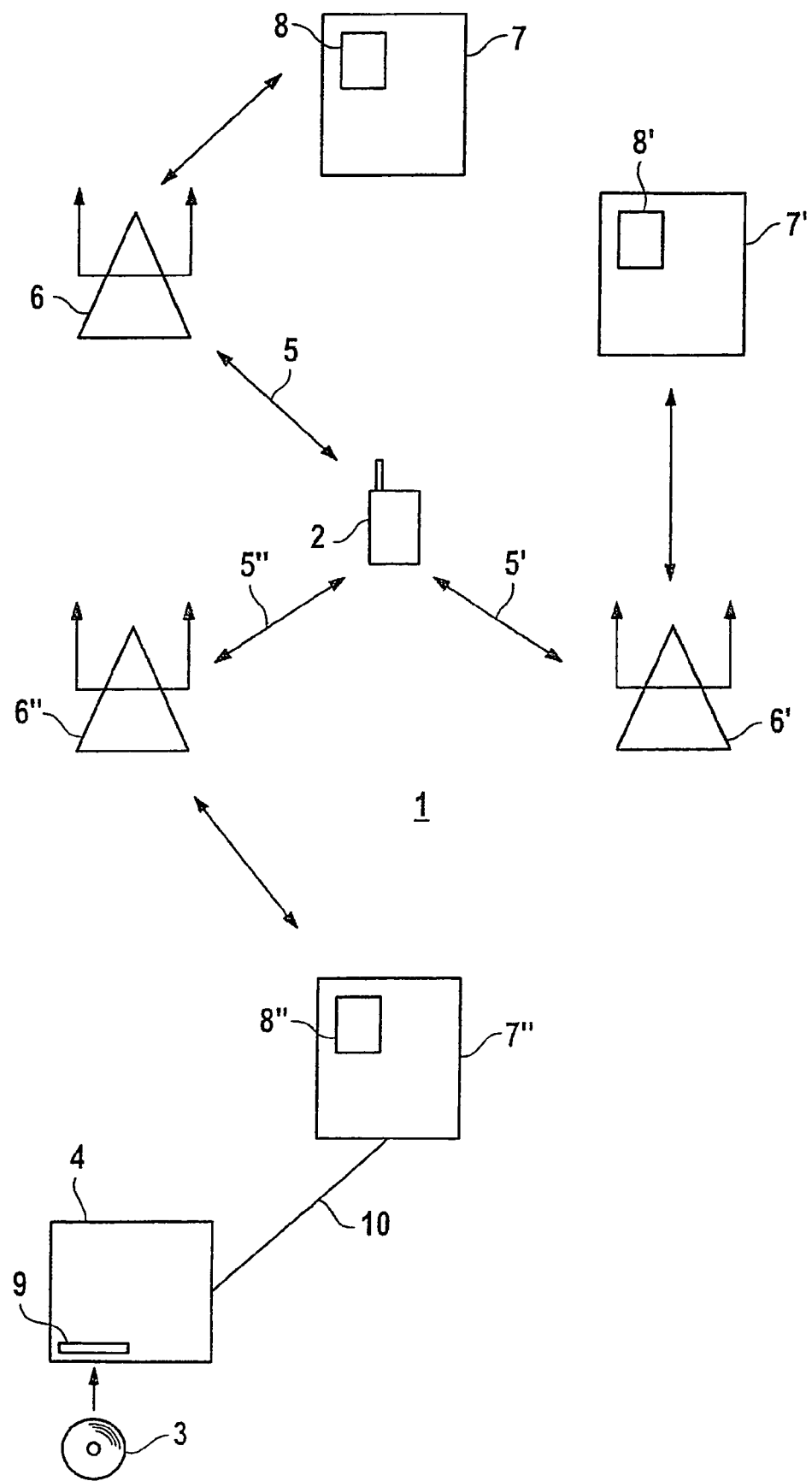

METHOD OF IDENTIFYING A RADIO LINK

TECHNICAL FIELD

The invention is based on a priority application EP 05291618.6 which is hereby incorporated by reference.

The invention relates to a method of identifying a radio link, whereby the invention can be used in heterogeneous networks. In heterogeneous networks terminals may access a multitude of telecommunication systems using a multitude of radio access technologies (RATs). The invention provides a method and a corresponding computer program product with which the best radio link can be identified for the application the terminal is expected to provide. The computer program product can be part of a terminal device or of a telecommunication communication system, in particular a wireless communication system.

BACKGROUND OF THE INVENTION

The evolution of cellular mobile communication networks beyond the third generation and the introduction of new broadband wireless access technologies such as WiMAX open the way to heterogeneous networks with a diversification of radio access technologies. In many cases providers offering the same RAT compete with each other on the market. Furthermore, a provider may offer services of different RATs to a user. As an example, a provider may provide UMTS (universal mobile telecommunications system) services as well as WLAN (wideband local area network) services. In such a situation the user is not interested in the particular technology, but is interested in getting the best quality of service (QoS) for his application. For that purpose it may be necessary to carry out a handover to another radio link with or without a change of the RAT.

In the prior art the desired application determines the RAT. If, for example, a high data rate is desired, e.g. for downloading music or a video file, WLAN is preferably used. If however, the user is interested in video telephony, UMTS is a good choice.

Providing the best radio link for an application requires in many cases vertical handovers, i.e. handovers from a communication system operating with a first RAT to a communication system operating with a second RAT. However, each RAT has its own QoS specifications as it has different modulation scheme and access schemes. As an example, a signal-to-noise-interference (SNI) ratio measured in a system using a first RAT, e.g. in a CDMA system, can hardly be compared with a SNI in a system using a second RAT, e.g. when a TDM link is established. As a consequence, the radio link quality in the new system cannot be anticipated and providing the best QoS for the user becomes difficult.

In the document A. Festtag, "Optimization of handover performance by link layer triggers in IP-based networks: parameters, protocol extensions and APIs for implementation", TKN technical report TKN-02-014, TU Berlin, version 1.1, August 2002, two phases of a handover process are identified: a handover detection and triggering phase and a handover execution phase. In order to speed up the first phase the authors suggest the definition of a link layer trigger for a handover. A parameter for this link layer trigger is an abstract measure of a signal quality. This abstract measure is obtained by a mapping of RAT-specific measurement values into this abstract measure.

SUMMARY OF THE INVENTION

It is an object of the present invention to provide a method of identifying a radio link which offers the best quality of service, in particular for a predetermined application.

It is another object of the invention to provide a method of selecting a radio link which improves network efficiency and load distribution in the communication system.

It is still another object of the invention to provide a computer program product, a terminal and a communication system applying the method.

This object and other objects are solved by the features of the independent claims. Preferred embodiments of the invention are described by the features of the dependent claims. It should be emphasized that any reference signs in the claims shall not be construed as limiting the scope of the invention.

The underlying principle of the invention is to use generic QoS parameters, which means RAT-independent parameters, to characterize the quality of a radio link. The generic QoS parameters may thus be used by systems using arbitrary RATs such as GSM, UMTS, WiMAX, WLAN, Bluetooth etc.

Each radio link is characterized by a set of such generic QoS parameters. The radio links might be associated with the same RAT. An example would be a situation in which a mobile terminal has access to different base stations belonging to the same communication system and using the same RAT such as UMTS. In the alternative the radio links may be associated with different RATs such as UMTS, WLAN, WiMAX etc.

Each generic QoS parameter is suitable to quantify at least an aspect of the quality of service of a radio link. The set of generic QoS parameters then serve to characterize the overall radio link quality. The generic QoS parameters may be identical to the QoS parameters known from UMTS or WLAN and may especially include:

- the mean and peak data rate (kbit/s)
- the packet delay (ms)
- the delay jitter (ms)
- the maximum packet loss rate (%) or the bit error rate or the block/frame error rate (per ‰).

A more comprehensive list of QoS parameters are listed in Table 1 for the case of UMTS systems. These are the radio access bearer attributes as defined in 3GPP document TS 23.107 V.6.1.0 and TS 25.413 V.6.0.0. Table 2 shows the QoS parameters for WLAN systems according to IEEE802.11e.

However, the QoS parameters may differ from the QoS parameters known from UMTS in order to take considerations of other RATs into account. This modified set of generic QoS parameters may be agreed upon in a standardization process. In the following description QoS parameters will always be generic QoS parameters unless otherwise indicated.

In a first step of the method generic QoS parameters are determined. More precisely, all QoS parameters for each of $n \geq 2$ radio links are determined. n is an integer. This determination can be done by a terminal device and/or by a wireless communication system as will be described below in more detail.

In a second step the multitude of QoS parameters of each radio link are mapped into a single value by means of a metric. A metric shall be understood to be a mathematical function having the multitude of QoS parameters as variables, whereby the metric calculates a value having a reduced number of variables. The output of the metric may be a matrix, a vector, or a scalar value. The value of the metric is calculated for each of the $n \geq 2$ radio links. The values obtained with the metric define the overall quality of service of each of the $n \geq 2$ radio links, such that the calculation serves to acquire values with which the overall radio link quality can be compared in an objective way.

Quantifying the quality of a radio link by means of the values of the metric then makes it possible to identify one of the $n \geq 2$ radio links in a third step as being the radio link offering the best overall quality of service. Consequently, the identified radio link is called the "best radio link". The third step thus consists of a simple comparison of the n≧2 values obtained in the second step.

The advantage of generic QoS parameters as used by the method disclosed above is that, if they are delivered to layer 3 or 3.5 or to a generic link layer on layer 2.5, they can be directly compared between two or more RATs. This means that systems operating with different RATs can easily interpret the QoS parameters of systems with another RAT as they use the same parameters, or simply speaking because they use the same language. This is however a prerequisite for anticipating aspects of the radio link quality for possible vertical handovers.

The use of the metric provides the advantage that it is possible to identify the best radio link for a terminal device. This is the basis for handover decisions in heterogeneous networks as it facilitates a handover to the best cell. As it will be described below in more detail it is also possible to choose a metric to identify the best radio link for a particular application running on the terminal device. As an example, it is possible to identify the best radio link for video streaming or video telephony. This is however the primary interest of a user which can thus be satisfied more easily.

Furthermore, it has the potential for increasing the network efficiency and the load distribution. Therefore, the metric to identify the "best radio link" is extended to include QoS parameter on the consumption of system resources, so that more efficient radio links, e.g. with a higher bit rate per bandwidth for the particular application, are preferred.

There are quite a few possibilities of determining generic QoS parameters. One possibility is to measure and/or estimate QoS parameters which are specific for a particular RAT and to map or transform them into generic QoS parameters. As an example, UMTS-specific QoS parameters may be mapped into generic QoS parameters. This means that existing algorithms for determining RAT-specific QoS parameters can still be used, and that only an additional piece of software is necessary to map the RAT-specific QoS parameters into generic QoS parameters. The mapping comprises information which is specific to only one single RAT, and is thus fully within the scope of OSI layer 2.

A second possibility of determining generic QoS parameters is to measure and/or estimate them directly. This is useful for a communication system offering services with several RATs. In this case the computer program for the determination of the QoS parameters is simplified as only a single algorithm is necessary instead of a multitude of algorithms for each RAT.

Another possibility of determining generic QoS parameters consists in receiving them. If it is the terminal device which determines the QoS parameters it may receive further generic QoS parameters from the communication system. In the alternative the mobile terminal may receive further RAT-specific QoS parameters from the communication system for mapping or transforming them into generic QoS parameters. The reception of parameters by the terminal is advantageous when specific or generic QoS parameters can't be determined by the terminal device itself, for example statistical data on medium usage. Furthermore, the received QoS parameters may be parameters from system information data bases which also contribute to the quality of service such as the type of the application capabilities such as hardware features and supported protocol options and access information operator policy network load for a load balancing between RATs and networks the supported mobility in the RAT, e.g. a typical cell radius or a maximum tolerated user velocity the signaling load and latency for the handover, the cost of link operation the security level dedicated access rights, e.g. in a non-public area of the network or in areas with restricted access user subscription restrictions and user preferences the latter e.g. due to connection costs.

If it is the communication system which determines the QoS parameters it may receive further generic QoS parameters from the terminal device. In the alternative the communication system may receive further RAT-specific QoS parameters from the terminal device for mapping or transforming them into generic QoS parameters. QoS parameters to be received by the communication system may be the type of the application measured QoS parameter such as link budget or data rate capabilities such as hardware features and supported protocol options the user position or velocity the time delay to switch between RATs (zero indicating parallel usability of both RATs in the terminal, dedicated access rights such as stored on a SIM card user preferences due to connection costs Instead of receiving the QoS parameters themselves it is also possible to receive only mathematical representations of them. The mathematical representation might be an intermediate value which can be inserted into the metric to calculate the radio link quality. The exact nature of this intermediate value depends strongly on the metric which is used. As an example, the communication system may determine 15 generic QoS parameters and may send an intermediate value representing these 15 parameters. The terminal device determines 10 generic QoS parameters itself, and uses them together with the intermediate value to calculate the value of the metric. As a further example, this approach is possible when the metric consists of the product of all QoS parameters. In this case the mathematical representation is the product of the above-mentioned 15 QoS parameters. This product is then multiplied with the 10 QoS parameters determined by the terminal device.

This approach has the advantage to reduce the signalling load.

As a matter of fact, it is not only possible to receive mathematical representations of generic QoS parameters, but also mathematical representations of RAT-specific QoS parameters. In this case the mathematical representation might be an intermediate value usable in the algorithm which maps the RAT-specific QoS parameters into generic QoS parameters.

After determining QoS parameters they are used for calculating a value of the metric. This may basically be done by an arbitrary combination of determined QoS parameters. If the communication system carries out the calculation, it may calculate the metric with generic QoS parameters received from the terminal device and with generic QoS parameters determined by itself. Correspondingly, if the terminal device carries out the calculation, it may calculate the metric with generic QoS parameters received from the communication system and generic QoS parameters determined by the terminal device.

In a preferred embodiment of the invention the values of the metric are scalar values. In this case comparing the quality of different radio links is particularly easy. As an example, a large value of the metric might indicate a link with good overall quality of service for an application, whereas a low value would indicate a link with bad overall quality of service.

In another preferred embodiment of the invention the metric is a configurable metric. Configurable means that parameters, namely parameters of the metric which are not QoS parameters, can be adjusted such that the terminal device or the communication system may adapt the metric to the specific situation, e.g. to the type of the application or to the operator policy. Furthermore, the configuration may be used to adjust the metric to a situation with limited availability of the QoS parameters, e.g. to calculate the metric results using only the QoS parameters it is able to determine but not those it would need to receive.

A configurable metric has the advantage of reducing the signalling between the terminal device and the communication system. The reason is that the configurable metric allows identifying radio links showing an unacceptably low radio link quality. As an example, the QoS parameters determined by a terminal device may indicate clearly that the radio link is unsuitable for internet browsing because the data rate is too low. In such a case the QoS parameters of these radio links are not transmitted to the communication system or the terminal device respectively as further calculations are unnecessary. This reduces the overhead by avoiding a transmission of QoS parameters, or mathematical representations of them, which will not be used for a future access anyway.

In a preferred embodiment the method includes the step of calculating a value of a metric for a multitude of radio links, and of creating a quality ranking of the multitude of radio links on the basis of their values of the metric. This quality ranking can be used for handover decisions to identify the radio links which offer a better quality of service as the current serving radio link. This can be used to decrease signalling even further as a transmission of QoS parameters over the air interface becomes only necessary when they indicate that the ranking might have changed. As a matter of fact, the quality ranking itself can be transmitted from the communication system to the terminal device or vice versa.

In a preferred embodiment of the invention the metric is calculated according to the formula $$\prod_i \left( \frac{QoS_{determined}(i)}{QoS_{application}(i)} \right)^{a_i}$$

$QoS_{determined}(i)$ are the determined QoS parameters as explained above.

$QoS_{application}(i)$ are the corresponding QoS parameters as requested by an application running on the terminal device.

i is an integer ranging from 1 to N, whereby N is the number of determined QoS parameters. $a_i$ are weighting factors.

In general $QoS_{application}(i)$ are maximum allowed values or minimum allowed values of generic QoS parameters for a particular application. Examples for a conversational application would be a delay in the MAC layer of less than 50 ms a jitter of less than 5 ms a bit-error-rate of less than 1%

For browsing in the internet $QoS_{application}(i)$ might be a delay in the MAC layer of less than 150 ms a data rate of more than 1 MBit/s a bit-error-rate of less than 0.1%

With the weighting factors $a_i$ the metric becomes a configurable metric, with which the metric can be adapted to the specific application running on the terminal device. The reason is that each application requires a specific set of QoS parameters. As an example, a MAC layer delay will have a higher weighting for a real-time application than for a background service. In the latter case the corresponding exponent $a_i$ might be set to one or even to zero. The weighting factors thus allow the determination of an application-specific link quality, and thus of a link quality measure which is specifically tailored to the demand of the user or to the operator. It might however be necessary to find a certain compromise value for these weighting factors in the case that the user uses different applications at the same time.

In a further embodiment the metric is calculated according to $$\prod_i (f_i(x_i))^{a_i},$$

whereby $f(x_i)$ is a mathematical function with $$x_i = \frac{QoS_{determined}(i)}{QoS_{application}(i)}.$$

An example of the function $f(x_i)$ will be a clip function as will be discussed below.

The calculation of the quality metric as disclosed above may yield unreasonable values in those cases in which one of the QoS parameters has an unacceptably low value, e.g. a value which is below a predefined threshold value. This can be compensated by complementing the metric with a clipping function, whereby the QoS component having this unacceptably low value is clipped to zero. This can be done by operating a clip function on some or all of the QoS ratios in the metric. This approach sets the whole metric to zero, such that this radio link will be disregarded in the quality ranking mentioned above. This avoids that a low measurement value of a first QoS parameter can be compensated by a high measurement value of a less important second QoS parameter.

Correspondingly, an over-provisioning of the QoS parameter may be clipped to a maximum value in the metric. In this case a QoS parameter in the metric shall not regard to have a value which is higher than the requested value. An example would be a radio link offering a data rate of 54 MBit per seconds for a video streaming which requires only 384 kBit/s. In this case the corresponding value of $QoS_{determined}(i)$ is set to 384 kBit/s for all those values which are larger than 384 kBit/s.

When the surmounting data rate doesn't further increase the term in the metric all links with sufficient bandwidth are counted equivalently. Thus, the clipping retains the significance of other parameters like delay or loss. In this case handovers can be restricted to those cases in which the target cell offers a new useful QoS improvement for the application.

According to a preferred embodiment of the invention each factor of the product of the metric is modified by a clip function $$clip_i(x) = \begin{bmatrix} 0 & \text{for} & x_i < min_i \\ x_i & \text{for} & min_i < x_i < max_i \\ max_i & \text{for} & max_i < x_i \end{bmatrix} \text{ with } x_i = \frac{QoS_{determined}(i)}{QoS_{application}(i)}$$

whereby $min_i$ represents a minimum allowed value and $max_i$ a maximum useful value of the quantity $x_i$. Using this clipping function can be done by the terminal device as well as by the communication system.

In a further preferred embodiment the weighting factors $a_i$ are updated from time to time and transmitted from the communication system to the terminal. This takes into account that the weighting factors will in most cases be operator-specific and subject to his policy, and may be changed from time to time to reflect changes of this policy. In such a case the determination of the parameters of the $n \geq 2$ radio links may be carried out by the terminal device which calculates the values of the metric after having received the weighting factors $a_i$ from the communication system.

In a further preferred embodiment the terminal device transmits a trigger to the communication system if the serving radio link is not the best radio link. In this case the best radio link, or a radio link which is better than the serving radio link according to the quality ranking, can be selected as a future serving radio link for a handover. This is especially useful when the handover decision is network based but shall for load reasons be decided not after each measurement but only in case of relevant events. Only when the terminal detects (by the use of its configured metric) such an event, it transmits a trigger signal to the network decision function. This trigger may include all or selected measured QoS parameter and a proposed handover target. The network then takes the final decision on the target link and on the proper timing for carrying out a handover.

It goes without saying that the method as disclosed above can be implemented in a terminal device and in a wireless communication system respectively, such that the invention can be carried out by a computer program. This computer program might be stored on the appropriate storage medium such as the CD or DVD, or may be transmitted by means of electrical carrier signals over a network such as the Internet.

These and other aspects of the invention will be apparent from and elucidated with reference to the embodiments thereafter. It should be noted that the use of reference signs shall not be construed as limiting the scope of the invention.

BRIEF DESCRIPTION OF THE DRAWINGS AND TABLES

FIG. 1 shows a communication system using the invention,
Table 1 lists QoS parameters for UMTS systems.
Table 2 lists QoS parameters for WLAN systems.
Table 3 lists generic QoS parameters as requested by an application,
Table 4 lists generic QoS parameters as determined by a mobile terminal,
Table 5 lists exponents of the quality metric,
Table 6 lists values of the metric with clipping,
Table 7 lists values of the metric without clipping.

DETAILED DESCRIPTION OF THE DRAWINGS AND OF THE PREFERRED EMBODIMENT

The only FIGURE shows a communication system 1 which is using the invention. A mobile terminal 2 may establish radio links 5, 5', 5" to base stations 6, 6' and 6" respectively. Base station 6 is a node B offering UMTS services, base station 6' is a node B offering UMTS and high speed downlink packet access (HSDPA) services, and base station 6" is a hot spot offering WLAN services. Each base station 6, 6' and 6" is in communication with a corresponding radio resource controller 7,7',7", each of which comprises a radio resource management system 8, 8',8". For sake of simplicity base stations 6, 6' and 6" belong to the same provider.

A system component 4 of the communication system 1 is connected with a fibre optic 10 to RNC 7". It includes an optical disk drive 9 for insertion of DVDs 3.

The provider has the possibility to transmit a metric from system component 4 via fibre optic 7, RNC 7" and hot spot 6" to terminal 2, namely the metric $$f = \prod_i \left( \frac{QoS_{measured}(i)}{QoS_{application}(i)} \right)^{a_i} \quad \text{(equation 1)}$$

The nature of the factors of this metric have been described above.

Table 3 shows QoS parameters as requested by an application of the terminal 2, this means $QoS_{application}$, for three different applications, namely video telephony, video streaming and a music download.

Table 4 shows the QoS parameters as measured by the terminal 2 at an example channel loss of one or two percent respectively. The metric, which is used for a calculation of the quality of the radio links is as follows:

$$f = \left( \frac{\text{available\_rate}}{\text{mean\_rate}} \right)^r * \left( \frac{\text{actual\_delay}}{\text{max\_delay}} \right)^d * \left( \frac{\text{actual\_loss}}{\text{max\_loss}} \right)^l \quad \text{(equation 2)}$$

Table 5 lists the exponents $a_1=r$, $a_2=d$, and $a_3=l$ as used in the metric. The terminal 2 receives the metric of equation 2 and the parameters $QoS_{application}(i)$, $i=\{1,2,3\}$, from the communication system 1, and stores them in its internal memory (not shown). It regularly measures the above-mentioned generic parameters directly.

Table 6 and 7 show the values of the metric. In the case of table 6 a clipping has been performed for those cases in which a factor of equation 2 is larger than 1. In this case the factor has been clipped to 1.

As can be derived from table 6 the best radio link for video telephony is access point 5 offering UMTS services only, access point 5' offering UMTS and HSDPA services is the best base station for video streaming, and hot spot 5" is the best base station for music downloads.

Table 7 shows the corresponding values of the quality metric in those cases in which no clipping has been performed. In the case of node B 5 offering UMTS services and servicing the terminal 2 with video streaming a very large number is obtained, namely 33,33. This is a high ranking even though the data rate is rather poor. The reason is that there is an overprovision of the delay requirement of a factor of more than 200.

LIST OF REFERENCE NUMERALS 01 wireless communication system
02 terminal
03 computer readable medium
04 system component
05 radio link
05' radio link
05" radio link
06 node B
06' node B
06" hot spot
07 radio resource controller
07' radio resource controller
07" radio resource controller
08 radio resource management (RRM) system
08' radio resource management (RRM) system
08" radio resource management (RRM) system
9 optical disk drive
10 cable

TABLE 1

| Traffic class | Conversational class | Streaming class | Interactive class | Background class |
|---|---|---|---|---|
| Maximum bitrate | X | X | X | X |
| Delivery order | X | X | X | X |

TABLE 1-continued

| Traffic class | Conversational class | Streaming class | Interactive class | Background class |
|---|---|---|---|---|
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit rate | X | X | | |
| Traffic handling priority | | | X | |
| Allocation/Retention priority | X | X | X | X |
| Source statistics descriptor | X | X | | |
| Signalling Indication | | | | X |

TABLE 5

| Application | Video telephony | Video streaming | Music download |
|---|---|---|---|
| r | 1 | 1 | 2 |
| d | −2 | −1 | 0 |
| l | −1 | −1 | −1 |

TABLE 6

| with clipping | UMTS | UMTS HSDPA | WLAN |
|---|---|---|---|
| Video telephony | 0.50 | 0.25 | 0.01 |
| Video streaming | 0.17 | 1.00 | 0.5 |
| Music download | 0.00 | 0.02 | 0.44 |

TABLE 2

| Element ID (13) | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|

Octets: ←1→ ←1→ ←3→ ←2→ ←2→ ←4→ ←4→ ←4→ ←4→

| Service Start Time | Minimum Data Rate | Mean Data Rate | Peak Data Rate | Burst Size | Delay Bound | Minimum PHY Rate | Surplus Bandwidth Allowance | Medium Time |
|---|---|---|---|---|---|---|---|---|

Octets: ←4→ ←4→ ←4→ ←4→ ←4→ ←4→ ←4→ ←2→ ←2→

TABLE 3

| QoS application | Video telephony (real time) | Video streaming 10 sec buffered | Music download (50 MByte File) |
|---|---|---|---|
| Minimum data rate | 16 kBit/sec | 16 kBit/sec | 384 kBit/sec |
| Mean data rate | 128 kBit/sec | 384 kBit/sec | 3000 kBit/sec |
| Maximum data rate | 384 kBit/sec | 1000 kBit/sec | 30000 kBit/sec |
| Maximum delay | 0.1 sec | 10 sec | 10 sec |
| Delay variance | 0.01 sec | 5 sec | 5 sec |
| Maximum packet loss rate | 5% | 1% | 10% |

TABLE 7

| without clipping | UMTS | UMTS HSDPA | WLAN |
|---|---|---|---|
| Video telephony | 10.0000 | 3.75 | 0.10 |
| Video streaming | 33.3333 | 50.00 | 13.02 |
| Music download | 0.00455 | 0.16 | 2.22 |

The invention claimed is:

1. A method of identifying a radio link of a terminal device to a wireless communication system, the method comprising the following steps:

TABLE 4

| QoS measured | UMTS | UMTS HSDPA | WLAN |
|---|---|---|---|
| Maximum data rate | 384 kBit/sec | 2000 kBit/sec | 54000 kBit/sec |
| Available data rate | 64 kBit/sec | 384 kBit/sec | 2000 kBit/sec |
| Available delay | 0.05 sec | 0.2 sec | 2 sec |
| Available delay variance | 0.01 sec | 0.01 0.01 sec | 1 sec |
| Available packet loss rate | 1% | 1% | 2% | a) determining values of parameters of n≧2 radio links, whereby the parameters of each radio link are suitable to quantify at least an aspect of the quality of service of this radio link, the parameters (QoS parameters) being generic QoS parameters usable by different radio access technologies,
b) calculating, for each radio link, a value of a metric with the associated determined QoS parameters, whereby the value of the metric defines the overall quality of service of the corresponding radio link,
c) identifying one of the n≧2 radio links (best radio link) as being the radio link offering the best quality of service by comparing the n≧2 values of the metric calculated in step b), wherein
determining values of generic QoS parameters is done by
measuring and/or estimating them, or
measuring and/or estimating QoS parameters specific to a radio access technology, and mapping the obtained values into generic QoS parameters.

2. The method according to claim 1,
wherein
determining values of generic QoS parameters is done by
receiving generic QoS parameters, or mathematical representations of generic QoS parameters, or
receiving RAT-specific Qos parameters and mapping them into generic QoS parameters.

3. The method according to claim 1,
wherein
calculating the metric is done with
generic QoS parameters received from the terminal device and generic QoS parameters determined by the communication system, and/or with
generic QoS parameters received from the communication system and generic QoS parameters determined by the terminal device.

4. The method according to claim 1,
wherein
the output values of the metric are scalar values.

5. The method according to claim 1,
wherein
the output values of the metric are scalar values, and that larger values indicate a higher quality of service of the associated radio link.

6. The method according to claim 1,
wherein
it further comprises the step of creating a quality ranking of the n≧2 radio links on the basis of the n≧2 values of the metric.

7. The method according to claim 1,
wherein
the metric is calculated according to $$\prod_i \left( \frac{QoS_{determined}(i)}{QoS_{application}(i)} \right)^{\alpha_i}$$

whereby $QoS_{determined}(i)$ are the determined values of the generic QoS parameters, whereby $QoS_{application}(i)$ are values of the generic QoS parameters as requested by a particular application running on the terminal device, and whereby $\alpha_i$ are weighting factors.

8. The method according to claim 1,
wherein
the metric is calculated according to $$\prod_i (f_i(x_i))^{\alpha_i},$$

whereby $$x_i = \frac{QoS_{determined}(i)}{QoS_{application}(i)},$$

whereby $QoS_{determined}(i)$ are the determined values of the generic QoS parameters, whereby $QoS_{application}(i)$ are values of the generic QoS parameters as requested by a particular application running on the terminal device, whereby $f_i(x)$ are mathematical functions and whereby $\alpha_i$ are weighting factors.

9. The method according to claim 8,
wherein
the functions $f_i(x)$ are clip functions of the type $$clip_i(x) = \begin{cases} 0 & \text{for} \quad x_i < min_i \\ x_i & \text{for} \quad min_i < x_i < max_i \\ max_i & \text{for} \quad max_i < x_i \end{cases} \text{with } x_i = \frac{QoS_{determined}(i)}{QoS_{application}(i)}$$

whereby $min_i$ represents a minimum allowed value and $max_i$ a maximum allowed value of the quantity $x_i$.

10. The method according to claim 9,
wherein
determining the parameters of the n≧2 radio links is carried out by the terminal device, and that the terminal device calculates the values of the metric after having received the weighting factors $\alpha_i$ from the communication system.

11. The method according to claim 6,
wherein
the terminal device transmits a trigger to the communication system if the serving radio link is not the best radio link, to course the communication system to consider or decide a handover to a better radio link as a future serving radio link.

12. A computer program product for identifying a radio link, the computer program product comprising a computer readable medium, having thereon computer program code means, when said program is loaded, to make a computer executable for carrying out the method according to claim 1.

13. A terminal device for accessing a wireless communication system,
wherein
comprising a computer program product according to claim 12.

14. A wireless communication system,
wherein
comprising a computer program product according to claim 12.

* * * * *

UNITED STATES PATENT AND TRADEMARK OFFICE
CERTIFICATE OF CORRECTION

PATENT NO. : 7,616,928 B2  Page 1 of 1
APPLICATION NO. : 11/486281
DATED : November 10, 2009
INVENTOR(S) : Oliver Blume It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Nineteenth Day of October, 2010

David J. Kappos
*Director of the United States Patent and Trademark Office*